July 31, 1951  N. E. LEE  2,562,195
MOUNTING
Filed July 7, 1945
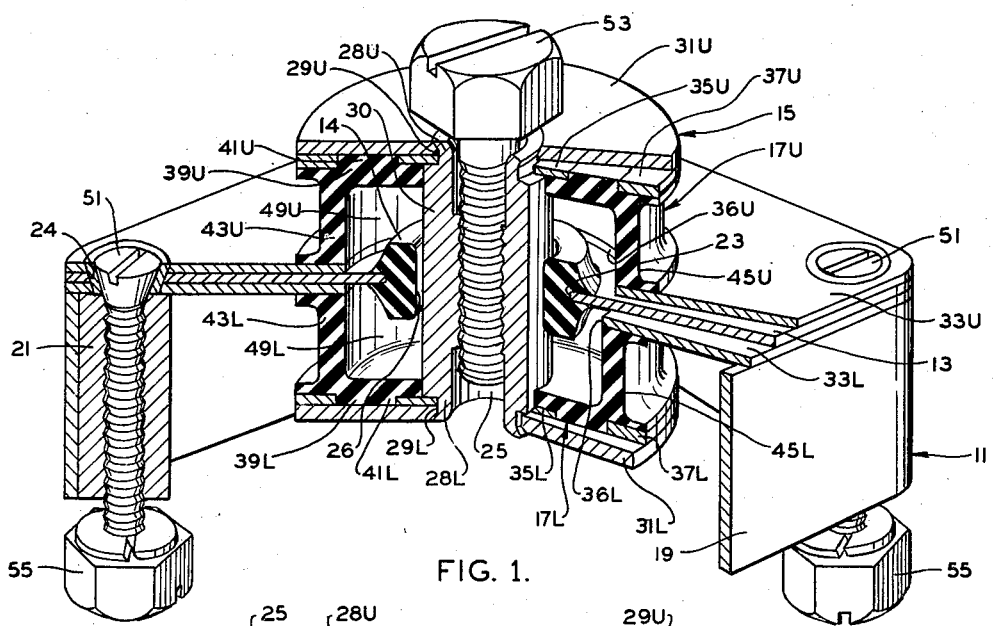
FIG. 1.
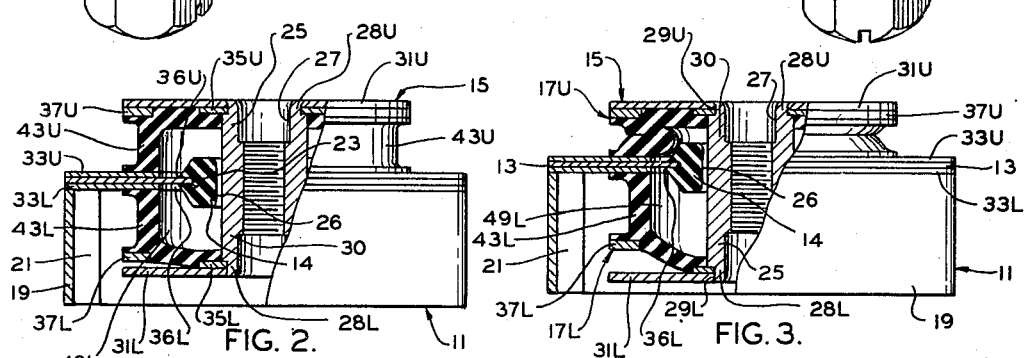
FIG. 2.  FIG. 3.
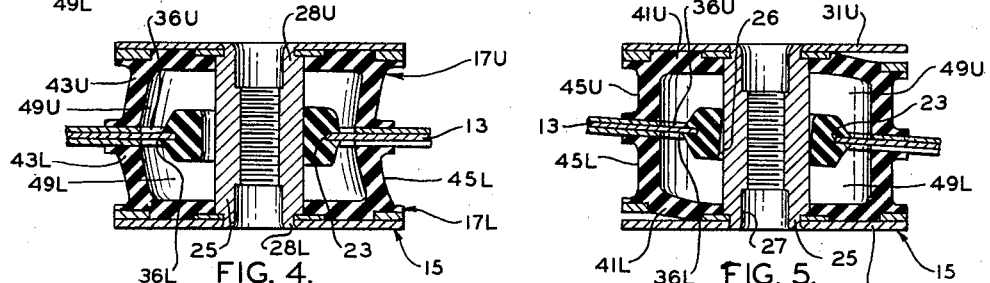
FIG. 4.  FIG. 5.
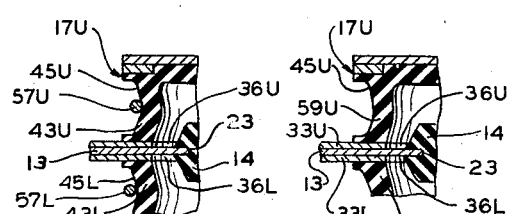
FIG. 6.  FIG. 7.
*INVENTOR.*
NORMAN E. LEE
BY 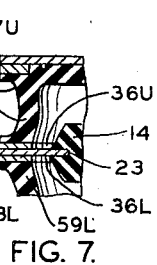
ATTORNEY

Patented July 31, 1951

2,562,195

UNITED STATES PATENT OFFICE 2,562,195

MOUNTING

Norman E. Lee, Forest Hills, N. Y.

Application July 7, 1945, Serial No. 603,734

7 Claims. (Cl. 248—358)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates to improvements in mountings and more particularly to improvements in mounting means of the type used to sustain a load relative to a base, so as to prevent, or at least minimize, the transmission of vibrations, shocks and noises from said load to said base, and vice versa.

Some installations require mounts which will protect against a number of different kinds of impulses. For instance, in aircraft sensitive apparatus must be shielded from forced vibrations of the engines and associated parts, at various speeds, including that speed at which there are generated vibrations of the resonant frequency of the mounted equipment, and also from shocks occurring in rough air and when landing.

In marine installations, provision must be made not only against vibrations set up by the engines, shafts and propellers, which operate at variable speeds, usually of lower frequencies than in aircraft, but also against deflections caused by pitching and rolling of the vessel.

In vehicular installations the problem is more complicated as the supports must provide protection against forced vibrations of the engines and associated parts, operating at variable speeds, including the natural vibrating frequencies, vibrations due to substantially uniform, minor irregularities of the road beds traversed by the vehicles, which usually have abrupt waveforms, and shocks due to holes and abnormal irregularities in the road surfaces. These conditions are greatly exaggerated in the case of military vehicles which often must cover terrain far rougher than that covered by other vehicles and which may also be subjected to ballistic impacts and concussions.

Vibration and shock mounts of the prior art, although used in tremendous quantities, have been found to be badly defective in performing their intended purposes.

Some mounts are capable of curtailing the transfer of vibrations of relatively high frequency, but are unsatisfactory because they allow vibrations at the resonant or natural frequency of the supported load to be so greatly amplified as to be seriously detrimental.

Some operate to attenuate deflections in only one direction of movement, such as vertical, and are therefore unsuited to installations requiring attenuation in several directions.

Some are equipped with snubbers which come into play abruptly when the deflections reach a certain amplitude and, as a result, they set up violent counterforces and regularly recurrent shocks which are often more destructive to sensitive apparatus than the vibrations and shocks which the mounts are intended to absorb.

Again, some mounts are so designed that, if the spring material (such as rubber) is injured, as by tearing, or there is a separation of a bond between the spring material and the metal, the mounted equipment may separate entirely from the base and be severely damaged.

Some supports, having hydraulic systems comprising a cylinder and a piston operating therein, have excellent vibration damping characteristics but are relatively large in size and are expensive to manufacture and maintain, and they also are subject to leakage of the hydraulic medium therefrom. In addition, they are generally good in only one direction and they require a spring system separate from the hydraulic system.

Some mounts put a tensile loading on the spring material, which results in greater drift and greater sensitivity to injury than other types of loading.

In some mounts, oscillations persist and add to later oscillations so as to amplify rather than reduce them.

It is intended by the present invention to provide shock and vibration supports which are not attended by defects of earlier mounts.

It is an object of the present invention to provide means of supporting equipment which will satisfactorily isolate and absorb vibrations and shocks of various frequencies.

It is also an object to provide a mount which may be stiff enough so as not to unduly amplify low frequency and resonant frequency oscillations, but still soft enough to attenuate high frequency oscillations and thrusts of great force, without giving rise to countershocks.

It is another object to provide a mount which incorporates both a shock absorbing system and a spring system in a single unit.

It is still another object to provide supports wherein the action of the spring system facilitates the operation of the absorbing system.

It is a still further object to provide such mounts wherein natural rubber or a similar material may be used as the spring system and wherein deformations of said material are utilized to accelerate the functioning of the shock absorption system.

It is a further object to provide supporting means which will cushion displacements in different directions, such as vertical, horizontal and rotational.

Another object is to employ hydraulic damping in mounting devices which are so designed that they will not suffer from leakage of the hydraulic medium, which will be small in size relative to earlier hydraulic mounts, which will not incorporate solid, nonresilient parts moving against each other with resultant wear, and changes in operating characteristics and replacement of parts.

It is still another object to provide mounts in which the hydraulic medium is confined in extensible chambers which provide the necessary volumetric capacity for the medium under different conditions of operation.

Still another object is to provide mounts having external dimensions which allow them to be substituted for presently manufactured mounts without necessitating structural changes in either the base or the load.

A still further object is to provide mounts designed to absorb and attenuate shocks in most directions to such a degree as to eliminate the need of snubbers and thereby avoid the violent countershocks frequently caused thereby.

It is still another object to provide mounts wherein metal to metal contacts are eliminated and hence the transfer of sound, as well as vibration and shock, is inhibited.

It is also an object to provide a mount which, despite unusual vibrations and shocks, and wear and tear, will not allow the equipment sustained thereby to tear loose entirely from the base.

It is yet another object to provide a mounting wherein the resilient material is subjected to a correcting tension to minimize the possibility of drift due to repeated compression or flexure.

It is another object to eliminate tensile loading of the spring material and the disadvantages resulting therefrom.

Generally, a mounting embodying the present invention includes a spring element, of a resilient, flexible material (such as natural or synthetic rubber), which, when deflected in at least one direction, is initially relatively stiff and gets softer and finally gets stiff again at extreme amplitudes. Such a spring element is preferably tubular in shape, and is first put into compression and acts as a column, and then collapses and goes into flexure. Such a spring element is relatively stiff under normal loads and will thus prevent undue amplification of the lower frequency vibrations (which are involved particularly in vehicular suspension), but under sharp surges gets progressively softer, so as to prevent the transmission or large force impulses to the equipment, and then gets progressively stiffer, so as to stop deflections within the amplitude limitations of the mounting without the need of abruptly acting snubbers. Each spring element is also fitted with means to apply a slight longitudinal tension to it each time it is deformed so as to counteract the possibility of drift of the material. In the interior of the mount are two chambers, connected by a restricted orifice, which contain a suitable hydraulic medium. In use of the mount, the hydraulic medium is forced back and forth through said orifice by deformations of the spring element described above.

A preferred embodiment, as illustrated in the drawings and as hereinafter described in more detail, comprises a load spool including two parallel load plates joined by a core; a base plate, having a central opening terminating in a tubular inner spring collar loosely encircling said core to form a restricted orifice, which base plate is interposed between and parallel to said load plates; two generally tubular spring elements interposed respectively between the base plate and each of the load plates. Said spring elements are suitably secured to opposite sides respectively of the base plate and to the peripheral portions of webs of similar resilient material. The inner portions of said webs are secured to the load spool. Each of said spring elements is preferably of the type described above. In the said mount there are two hydraulic chambers containing a suitable hydraulic medium.

In the accompanying drawings,

Figure 1 is a perspective view, partly cut away, of a preferred form of mounting embodying the parent invention, shown in its normal at rest, condition;

Figure 2 is an elevational view, to a reduced scale, of the mounting (with the fastening bolts removed) of Figure 1, partly broken away and vertically diametrically sectioned showing the mounting when the base plate and associated parts are deflected upwardly a small amount and the upper spring element is acting as a column under compression;

Figure 3 is a view similar to Figure 2, the base plate and associated parts being shown deflected upwardly to their positions of nearly maximum amplitude;

Figure 4 is a fragmentary similar vertical cross sectional view, the base plate and associated parts being shown deflected laterally to the left;

Figure 5 is a fragmentary view similar to Figure 4, the base plate, etc., being shown deflected rotationally in a clockwise direction;

Figure 6 is a fragmentary vertical section of a modified form of the mounting of Figures 1–5, wherein each spring element is encircled by a hoop which bows it inwardly so as to modify the operating characteristics of the mount;

Figure 7 is a fragmentary vertical section of a second modified form, wherein each of the spring elements is preformed with an inward bow about its central portion, so that any vertical thrust causes direct flexure.

Referring now particularly to Figures 1 through 5, the mounting there shown is made up of a base assembly 11, a base plate 13, an inner spring collar 14, a load spool 15, and upper and low spring assemblies 17U, 17L.

The base assembly 11 is made up of a vertically positioned, short, square tube 19, of heavy sheet metal, into each of the corners of which is securely fastened, as by welding, a vertically disposed, internally threaded, square, metal boss 21. The base plate 13 is a horizontally disposed square plate of heavy sheet metal, provided with a centrally disposed, circular opening 23 and pierced by four small corner hoes 24. The inner spring collar 14 is a tube of resilient material, such as natural or synthetic rubber, which is disposed coaxially with the circular opening 23 and its outer central peripheral portion is securely fastened to the marginal edge of said opening 23, as by a suitable metal to rubber bond. The interior of said tubular collar 14 forms a restricted orifice 26, as will be hereinafter explained.

The load spool 15 includes a vertically disposed circular metal core 25, axially pierced by a circular hole 27 which is screw threaded at its middle portion. The upper and lower end portions 28U, 28L of said core 25 are of lesser out-side diameter than the central portion 30 thereof, so as to form the upper and lower rabbets 29U, 29L. Secured to the opposite ends of said core 25, and normal thereto, are horizontally disposed, upper and lower load plates 31U, 31L which are flat circular disks of heavy sheet metal, are centrally pierced by countersunk openings and are rigidly secured to the opposite ends of the core, as by swaging. The core 25 and the load plates 31U, 31L, integral therewith, form the load spool 15. The core 25 extends loosely through the orifice 26 in the inner spring collar 14, the load plates 31U, 31L being parallel to said base plate 13 and above and below it.

The lower spring assembly 17L is made up of a lower elastic member 39L, a lower auxiliary base plate 33L which is a duplicate of the base plate 13 mentioned above, except that it is provided with a larger central circular opening 36L, a lower interior washer 35L and a lower exterior washer 37L. The interior washer 35L is of a size to allow it to fit into the rabbet 29L. The two washers 35L, 37L and the auxiliary base plate 33L are coaxially disposed, the washers 35L, 37L being coplanar and spaced from and below said plate 33L. A lower elastic member 39L, of a suitable resilient flexible material (preferably a fairly stiff compound of natural or synthetic rubber), is secured (as by a rubber-to-metal bond) to the said lower washers 35L, 37L and the lower auxiliary base plate 33L.

Said lower elastic member 39L is generally cup-shaped, being provided with a lower, horizontally disposed, flat, washer-like web 41L and a lower, collapsible, tubular, spring element 43L. Said lower web 41L is pierced by a central aperture of a size to make a snug fit about the central portion 30 of the core 25. The lower spring element 43L is provided with an exterior circumferential channel 45L. The two lower washers 35L, 37L are flush with the lower surface of the cup-shaped, elastic member 39L.

Said lower spring assembly 17L is interposed between the base plate 13 and the lower load plate 31L, the base plate 13 and the lower auxiliary base plate 33L being superimposed in peripheral register and securely fastened to each other (as by seam-welding), and the lower interior washer 35L being held tightly in the rabbet 29L by the lower load plate 31L. An upper spring assembly 17U, which is a duplicate of the lower spring assembly 17L, but in an inverted position, is similarly interposed between the base plate 13 and the upper load plate 31U.

Thus it will be seen that there are formed two interior annular hydraulic chambers 49U, 49L which are filled with a suitable hydraulic medium (not shown). Said upper and lower hydraulic chambers 49U, 49L encircle the core 25, and are, respectively, above and below the base plate 13, and they intercommunicate by way of the restricted orifice 26.

The base plate 13 and the upper and lower auxiliary base plates 33U, 33L are seam-welded together, as aforesaid, to form an integral member, which is secured to the upper end of the base assembly 11 by means of four, flat headed, countersunk, machine screws 51, which are threaded into the upper ends of the bosses 21. The opening 27 is provided with a bolt 53 and the lower end of each of the four internally threaded bosses 21 is provided with a bolt 55.

In the modification, shown in Figure 6, the mount is the same as that already described and illustrated in Figures 1–5, except that, surrounding the spring elements 43U, 43L and disposed in the channels 45U, 45L, respectively, are upper and lower hoops 57U, 57L which are of a diameter to slightly bow the central portions of said spring elements inwardly, circumferentially, so that vertical thrusts on the mount cause said spring elements 43U, 43L to go into flexure directly or when subjected to thrusts of lesser force than would produce flexure in the absence of the loops 57U, 57L.

The modified form, illustrated in Figure 7, is also similar to the form first described, except that the spring elements 59U, 59L are preformed with an inwardly extending circumferential bow, with the result that any vertical thrust results directly in flexure of said spring elements.

In describing the operation of the embodiment of the present invention illustrated in Figures 1–5, it will be assumed that the mount is being used to sustain a radio set in a motor vehicle. When so installed, the mounting is secured to the chassis of the motor vehicle (not shown) by means of the four bolts 55 and the radio set (not shown) is secured to the mounting by means of the bolt 53.

When so installed, vibrations and shocks of various frequencies and directions are imparted to the chassis of the motor vehicle, as a result of operation of the motor thereof, road bed irregularities, etc. As most vibrations and shocks and particularly those of greater force and amplitude will probably be found to occur mainly in a vertical direction, the mount should be installed with its axis disposed vertically, as shown in the drawings, as its vibration and shock attenuating properties are greatest in that direction. The base assembly 11, the base plate 13 and the upper and lower auxiliary base plates 33U, 33L will oscillate vertically with the chassis of the motor vehicle. Vertical thrusts of relatively little force will cause the spring elements 43U, 43L to alternately undergo vertical compression as a column (such compression of the upper spring element 43U being illustrated in Figure 2). Under vertical thrusts of greater force, the said spring elements 43U, 43L will be caused alternately to collapse and bend inwardly into flexure (as shown in Figure 3, where the upper element 43U is shown collapsed).

It will be noted that, under no condition of operation, are the spring elements 43U, 43L subjected to excessive vertical tension. This is due to the fact that the said spring elements 43U, 43L are not connected directly to the end plates 31U, 31L, but only by way of the webs 41U, 41L. Thus, when the base plate 13 is deflected upwardly, the lower end of the lower spring element 43L and the lower exterior washer 37L, integral therewith, move upwardly with said plate 13, so as to move away from the lower load plate 31L. The outer periphery of the lower web 41L is thereby pulled upward while its inner periphery is held down by virtue of the fact that the lower interior washer 35L is locked against the lower end plate 31L. On the other hand, the web, when so deformed, does exert a slight downward tensional pull on the lower end of the lower spring element 43L, thereby helping to neutralize any drift of the resilient material, which might otherwise result from the repeated compressive and flexure strains to which it is subjected.

As the base plate 13 and the inner spring collar 14 are oscillated up and down, it will be seen that the volumetric capacities of the upper and lower hydraulic chambers 49U, 49L are alternately reduced and increased. Relatively small deflections of the base plate 13 (which, however, are large enough to cause flexure of the spring elements 43U, 43L) cause changes in the relative volumetric capacities of the hydraulic chambers 49U, 49L which are out of all proportion to such small deflections. For example, when the base plate 13 is deflected upwardly and the upper spring element 43U collapses, the upper chamber 49U is being reduced in height and at the same time said upper spring element 43U is extended into said chamber to further greatly reduce its size. Simultaneously, the lower chamber 49L is being increased in volume in view of the fact that the inner portion of the web 41L is being extended downwardly. Thus, it is seen that the relative changes in volumetric capacity of the two chambers 49U, 49L is greatly accelerated by the deformations of the spring elements 43U, 43L and the webs 41U, 41L.

In view of such changes in the relative volumetric capacities of the said chambers 49U, 49L, the hydraulic medium therein is forced to and fro between the chamber through the restricted orifice 26. The work done in forcing the hydraulic medium through the said restricted orifice 26 results in an absorption of considerable energy. This is particularly true when a highly viscous medium, such as very heavy oil is used.

Any horizontal oscillations of the motor vehicle chassis cause similar horizontal oscillations of the base assembly 11, the base plate 13 and the auxiliary base plates 33U, 33L, thereby causing the spring elements 43U, 43L to be put into shear (as indicated in Figure 4) thereby attenuating horizontal components of vibrations and shocks. As the core 25 makes a loose fit within the inner spring collar 14, lateral deflections of small amplitude may occur without any deformation at all of the said collar 14. However, under greater lateral thrusts, the said spring collar 14 will act as a cushion, being subjected to compression on one side of the core 25 and tension on the other (Figure 4).

It will be noted that, during such lateral deflections, the shapes of the hydraulic chambers 49U, 49L are being changed constantly, thus requiring that the hydraulic medium contained therein be pushed around within said chambers (even though there may be no flow to and fro between the chambers), thereby resulting in an absorption of energy.

Should there be any twisting or rocking movements imparted to the base plate 13, the mount described has sufficient rotational compliance to attenuate them (as shown in Figure 5). Any other movements imparted to the base plate 13 will merely be a combination of the movements already described.

During such rotational movements there will also be an energy absorption due to the hydraulic system as there may be some flow of the hydraulic medium between the chambers 49U, 49L and, in any event, the medium will be pushed around within each of said chambers in view of the fact that they will be changing shape constantly.

It will be understood that, although the amplitude of the mount just described is limited toward the ends of vertical strokes, the mount gets progressively stiffer as it approaches a maximum deflection and thus stops movements gently, without any abrupt jolts, as occur in mounts utilizing bumpers.

The modified forms, shown in Figures 6 and 7, indicate how the load-deflection curve of such a mount be varied for particular installations. In the first of said modifications (Figure 6) hoops 57U, 57L are placed respectively around the spring elements 43U, 43L so as to entirely eliminate any column action at all. The hoops 57U, 57L may be of metal, or even of a resilient material, such as natural or synthetic rubber. Any vertical thrust on the mount causes the spring elements 43U, 43L to go directly into flexure and collapse. If it is merely desired to change the load-deflection curve of a mount (as shown in Figures 1–5), so as to change the point where collapse will occur, this may also be accomplished by hoops 57U, 57L which bow the spring elements 43U, 43L inwardly but very little. It is notable that by the artifice of supplying several hoops 57U, 57L with a particular mount, its load-deflection characteristics may be so varied and its load range may be so increased as to reduce the number of different mounts which must otherwise be manufactured for various installations. Thus, a mount may be fabricated with relatively heavy and stiff spring elements 43U, 43L so as to take relatively heavy loads but the same mount may be softened up to take lighter loads in several ranges by providing it with several sets of hoops 57U, 57L.

The spring elements 59U, 59L of the second modified form of mounting (Figure 7) are so shaped that they will go directly into flexure upon being subjected to any vertical thrust, due to the fact that the inward bow of said spring elements makes it impossible for them to act as columns under compression at all.

The steady energy absorption by the hydraulic system, of the mounts described above, combined with the increasing recovery force stored up in the spring systems as the amplitude of deflection increases, results in a time lag in the deflection, thereby keeping the amplitude of deflection within the predetermined limits of a particular mount. Thus, by a steadily increasing storage and absorption of energy, the vibrations and shocks are attenuated without the use of snubbers, which may act with an injurious abruptness.

An important feature of the present invention is that axial deflections of small amplitude cause relatively large changes in the shapes and sizes of the hydraulic chambers 49U, 49L. These relatively large changes are particularly advantageous where a hydraulic medium of low viscosity is used as it results in more rapid movements of the medium about and between said chambers 49U, 49L and, hence, a greater absorption of energy. Low viscosity liquids may sometimes be preferred because they may be more satisfactory over greater temperature ranges. It will be understood that the hydraulic medium may be either gaseous, or liquid, or a combination of both. In some installations such combination would be helpful so as to allow volumetric changes within the hydraulic chambers 49U, 49L without undue deforming strain on the material of the elastic members 39U, 39L. A compressible medium also helps to compensate for pressure changes due to temperature variations.

To appreciate the superiority of mounts embodying the present invention, some study of load-deflection curves is profitable. Many commercial mounts today have a substantially linear load-deflection curve; that is, deflection and load increase at about a constant ratio except that, toward the end of the curve, the load increases more rapidly than the deflection. Thus, a load-deflection curve for such a mount is a fairly straight slanting line which swings upward steeply toward the end.

Mounts embodying the present invention, on the other hand, as already explained, are relatively stiff at first, then get softer, and finally get stiff again. Thus, a load-deflection curve for such mounts is initially quite steep and then proceeds at a lesser slope and finally swings upward again to the end of the curve.

It should be understood that a shock mount which has the best load-deflection curve is one which, for a given displacement and energy absorption, will transmit the smallest forces.

One of the members to which a shock mount is fastened such as the chassis of a motor vehicle in the example mentioned above has a certain kinetic energy due to its movement. This energy must be accepted ideally by the shock mount. The energy is translated in the shock mount to the potential energy involved in straining the resilient material. The potential of strain energy is the work done in deforming the mount and it is equal to the area under the portion of the load-deflection curve traversed. The greater the thrust to which a mount is subjected and, hence, the greater the attendant kinetic energy, the larger the area under the curve.

Thus, it is seen that a mount is most satisfactory when its deflection curve is such that, for a given deflection, the area under the curve is at a maximum. It is obvious that a load-deflection curve, which is initially steep and then proceeds at a lesser slope (as in the present mount), will provide more area under it and, hence, more energy absorption than a deflection curve which is relatively linear (as is typical of present commercial shock mount practice, as mentioned above).

For thrusts having relatively large energy, it will be understood that, to absorb said energy, a relatively large area under the load-deflection curve is necessary. As the load-deflection curve of the present mount provides such area throughout the beginning of the curve, the deflection of the mount need not be as great for commercial mounts having a relatively linear curve and, hence, the force transmitted by the present mount is less than that transmitted by such commercial mounts.

Although the embodiments shown in the drawings have particular geometries, it will be understood that various changes in geometry may be made within the spirit of the invention. Such changes in geometry, and changes in relative sizes of elements, and other modifications may be made to suit the present mounting of different compounds of natural or synthetic rubber, to different hydraulic mediums and to different loading values.

Although not shown in the illustrated embodiments, it would be helpful to incorporate means for injecting the hydraulic medium into the chambers 49U, 49L after the mountings are assembled.

Although a particular mount will obviously be designed with certain loads, vibrations and shocks in mind, it is conceivable that in use a mount may be subjected to unanticipated conditions or it may be used beyond the intended useful life span of its resilient material. Should this occur the resilient material may rupture or one of the bonds between the elastic members 39U, 39L and the auxiliary base plates 33U, 33L and the washers 35U, 35L may let go. Nevertheless, the load will not separate from the base and fly into space as the base plate 13 and the auxiliary base plates 33U, 33L are imprisoned upon the load spool 15.

It will be understood that the mounts described will also operate with the base assembly 11 secured to a load and the load spool 15 secured to a base.

While there have been described what at present are considered preferred embodiments of the present invention, it will be obvious to those skilled in the art that various changes and modifications may be made therein without departing from the invention and it is, therefore, aimed in the appended claims to cover such changes and modifications as fall within the true spirit and scope of the invention.

What is claimed is:

1. A mount to sustain a load relative to a base, comprising a base plate provided with a central opening; an annular spring collar of resilient material disposed coaxially with said opening and secured to said base plate; a load spool, including a core extending substantially axially through said spring collar and being spaced slightly therefrom so as to form a restricted annular orifice between said core and said collar, and two load plates secured substantially normally to said core and on opposite sides of said base plate respectively; two spring assemblies interposed between said base plate and said load plates respectively, each of said spring assemblies including a substantially tubular spring element adapted to undergo longitudinal compression in response to slight axial thrusts and to collapse into flexure under axial thrusts of greater force, each of said spring elements being secured at one end to said base plate; each of said spring assemblies also including a web secured to the other end of said spring element, the inner portions of said webs being secured to the load spool proximate respectively to the two load plates; whereby there are formed respectively bounded at least partially by said spring assemblies, and on opposite sides of said base plate, two hydraulic chambers which intercommunicate by way of said restricted orifice; a hydraulic medium within said hydraulic chambers; whereby under axial thrusts of relative slight force the spring elements compress longitudinally alternately, and under axial thrusts of greater force the said spring elements collapse into flexure alternately, and in both instances hydraulic fluid is caused to flow back and forth through the restricted orifice, and under lateral thrusts of slight force attenuation is accomplished without deformation of the spring collar, and under lateral thrusts of greater force deformation of the spring collar assists in accomplishing attenuation.

2. A mounting to sustain a load relative to a base, comprising a base plate pierced by a central opening; an annular spring collar of resilient material coaxial with said opening and secured to said base plate; two auxiliary base plates disposed respectively on opposite sides of said base plate and secured thereto to form an integral member, said auxiliary base plates being pierced by central openings of greater diameter than said opening in the base plate and disposed coaxially therewith, the openings in said auxiliary base plates being in mutual register; a load spool, including a central core, and two load plates secured normally thereto, said core extending axially loosely through said spring collar, and the load plates being disposed parallel to said auxiliary base plates and respectively spaced therefrom; two tubular spring elements interposed respectively between the two load plates and the two auxiliary base plates, each such spring element being of resilient flexible material and being bounded by a substantially cylindrical inner surface and a circumferentially concave outer surface, so that it undergoes compression under relatively slight axial thrusts and collapses inwardly into flexure under greater axial thrusts, a first end of each of said spring elements being bonded to one of said auxiliary base plates; two washer-shaped webs of resilient material, the inner portions of which are secured to the load spool, and the outer peripheral portions of which are secured respectively to second ends of the spring elements.

3. A mounting as set forth in claim 2, wherein a stiff washer is secured to the outer peripheral portion of each of said webs, and said washers and spring elements are movable relative to said spool during operation.

4. A mounting to support a load relative to a base, comprising in combination, a base plate having an opening therethrough; means to secure said base plate to a base; an annular spring collar of resilient material secured to the marginal edge of said opening; a load spool including a core and two spaced load plates secured substantially normally thereto, the core extending through said spring collar and being spaced slightly therefrom so as to form a restricted orifice, annular in shape, between said core and said spring collar, and the base plate being positioned intermediate, and spaced from, said load plates; means to secure the load spool to a load; two substantially cup-shaped elastic members of resilient flexible material interposed respectively between the two load plates and the base plate, each such cup-shaped member including a tubular spring element, the outer central surface of which is provided with a circumferential concavity, and a web disposed substantially normally to said tubular spring element and secured to a first end thereof, said web being provided with an inner opening encircling the core; a stiff washer secured to said first end of said spring element; means to secure the inner marginal edge of each web to the load spool; the two cup-like spring members facing each other and at least partially bounding two enclosed extensible annular hydraulic chambers respectively on opposite sides of the base plate, said chambers being intercommunicating by way of said restricted orifice; and a hydraulic medium within said chambers.

5. In combination with a mount to sustain a load relative to a base, a spring element of resilient flexible material which, at rest, in longitudinal cross section, is of greater length than width and which, when subjected to a longitudinal thrust of increasing magnitude, first acts as a compressive column and becomes progressively hard and suddenly buckles laterally into flexure and becomes relatively soft, and means to modify the operating characteristics of said spring element, which means, at rest, retains a central portion of said spring element in a laterally deflected position so that, when subjected to any longitudinal thrust, said element acts immediately in flexure and is relatively soft.

6. The combination defined in claim 5, wherein said spring element is of tubular lateral cross sectional configuration, and said modifying means is tubular and encircles said central portion of said spring element and retains said central portion in an inwardly deflected position.

7. A mounting to support a load relative to a base, comprising in combination, a base plate having an opening therethrough; means to secure said base plate to a base; an annular spring collar of resilient material secured to the marginal edge of said opening; a load spool including a core and two spaced load plates secured substantially normally thereto, the core extending through said spring collar and being spaced slightly therefrom so as to form a restricted orifice, annular in shape, between said core and said spring collar, and the base plate being positioned intermediate, and spaced from, said load plates; means to secure the load spool to a load; two substantially cup-shaped elastic members of resilient flexible material interposed respectively between the two load plates and the base plate, each such cup-shaped member including a tubular spring element, and a web disposed substantially normally to said tubular spring element and secured to a first end thereof, said web being provided with an inner opening encircling the core; a stiff washer secured to said first end of said spring element; means to secure the inner marginal edge of each web to the load spool; the two cup-like spring members facing each other and at least partially bounding two enclosed extensible annular hydraulic chambers respectively on opposite sides of the base plate, said chambers being intercommunicating by way of said restricted orifice; and a hydraulic medium within said chambers.

NORMAN E. LEE.

REFERENCES CITED

The following references are of record in the file of this patent:

UNITED STATES PATENTS

| Number | Name | Date |
|---|---|---|
| 1,032,454 | Wainwright | July 16, 1912 |
| 2,380,899 | Strachovsky | July 31, 1945 |

FOREIGN PATENTS

| Number | Country | Date |
|---|---|---|
| 501,167 | Great Britain | Feb. 22, 1939 |
| 385,912 | France | Apr. 2, 1908 |
| 50,180 | France | Oct. 10, 1939 |